April 20, 1948.  F. HIGGINS  2,439,851
EXTENSIBLE HAND TRUCK
Filed Aug. 28, 1945  2 Sheets-Sheet 1
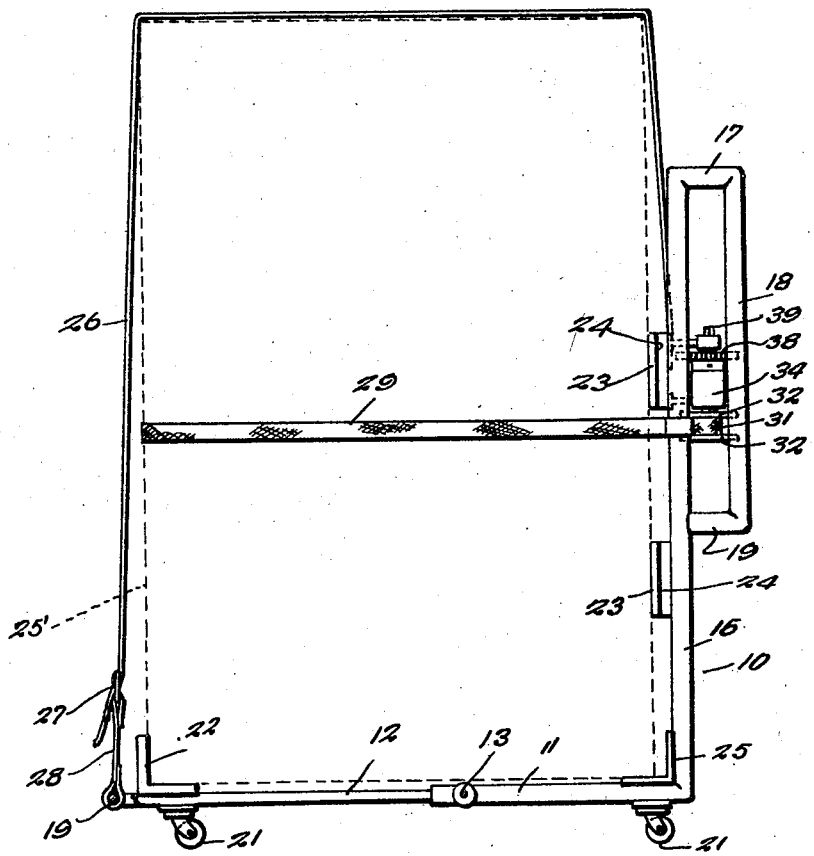
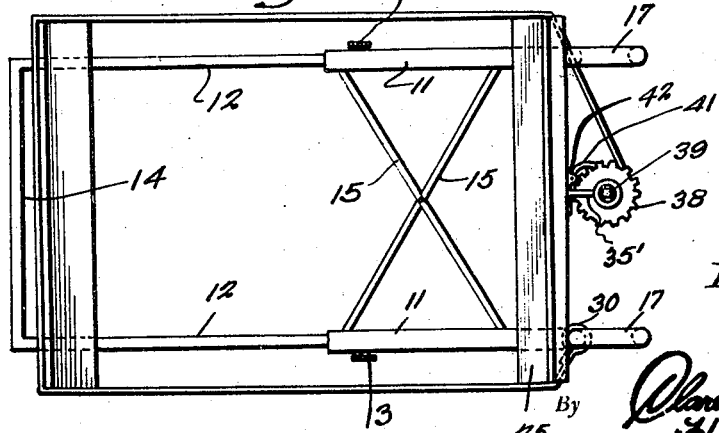
Inventor
FRANK HIGGINS April 20, 1948. F. HIGGINS 2,439,851
EXTENSIBLE HAND TRUCK
Filed Aug. 28, 1945 2 Sheets-Sheet 2
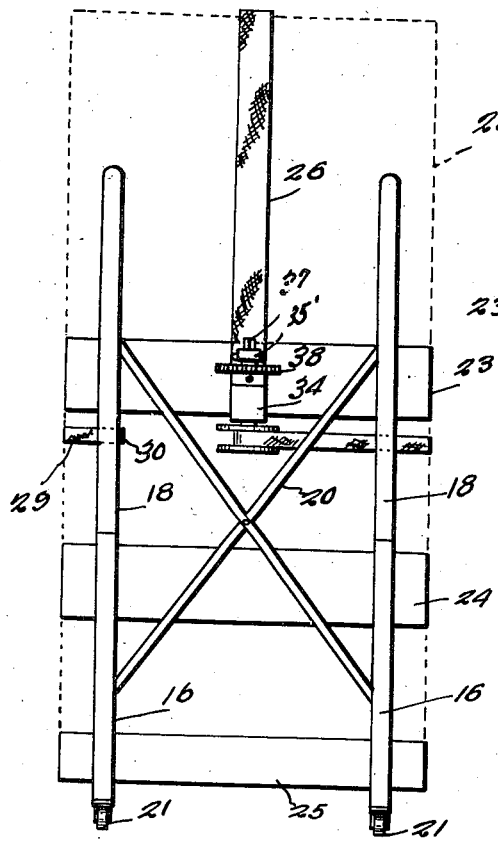
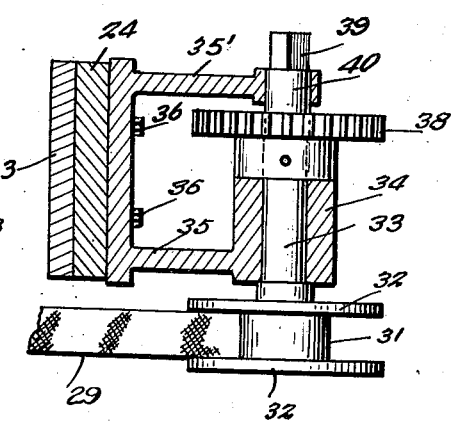
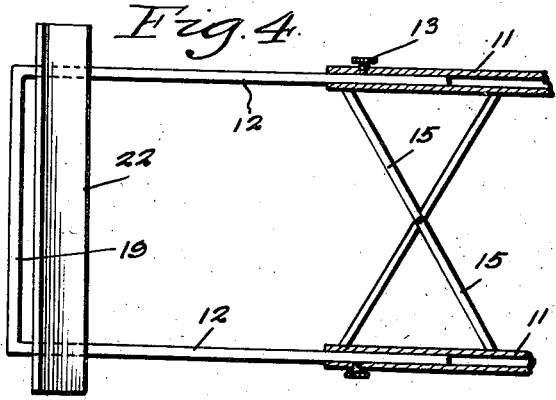
Inventor
FRANK HIGGINS
By
Attorneys Patented Apr. 20, 1948

2,439,851

UNITED STATES PATENT OFFICE 2,439,851

EXTENSIBLE HAND TRUCK

Frank Higgins, Princeton, Ill.

Application August 28, 1945, Serial No. 613,109

3 Claims. (Cl. 280—34)

This invention relates to a hand truck, and more particularly to such a truck adapted for the moving of household appliances, such as heaters, water tanks, ranges, and similar articles.

A primary object of this invention is to facilitate the moving of such articles as above enumerated, and others.

An additional object of the invention is the provision of a hand truck readily operable by one or two men to transport such articles without the danger of marring the furniture or the woodwork within a dwelling, or the like.

An important feature of the invention is the provision of such a truck including an extensible frame whereby articles of different size may be readily handled thereon.

A further feature of the invention resides in ratchet pawl means in association with a belt, or the like, adapted to hold the article to be moved on the truck without marring the same.

A still further feature of the invention resides in the provision of such a truck provided with caster-type wheels whereby the same may be readily moved around corners, into narrow spaces, and the like.

Other objects will in part be obvious and in part be pointed out hereinafter and shown in the accompanying drawings, wherein there is disclosed a preferred embodiment of this inventive concept.

In the drawings:

Figure 1 is a side elevational view of one form of hand truck embodying features of the instant inventive concept, certain parts thereof being broken away, Figure 2 is a top plan view of the device shown in Figure 1, Figure 3 is a rear elevational view of the device, Figure 4 is a fragmentary view partially in elevation and partially in section showing the manner of varying the effective length of the base of the device, and Figure 5 is an enlarged fragmentary view partially in elevation and partially in section disclosing a portion of the adjusting mechanism for the device.

Similar reference characters refer to similar parts throughout the several views of the drawings.

Having reference now to the drawings, the truck, generally indicated at 10, includes a base comprised of two parallel tubular members 11 into which rods 12 are adapted to fit telescopically, set-screws 13 being provided to hold the rods and tubes in adjustable related assembly. The rods 12 are joined at their outer extremities by a cross-bar 14, and angularly disposed reinforcing members 15 are provided between the tubular members 11. The members 11 extend upwardly as indicated at 16 to form a back support for the device, and are looped, as at 17, and reversely bent downwardly as at 18 to provide handles. Inwardly turned portions 19 extend from the downwardly depending portions 18 and are secured to the upright members 17. As best shown in Figure 3, angularly disposed reinforcing members 20 extend between the upright portions 16.

The base is supported on fully rotatable caster wheels 21 positioned at the four corners thereof, whereby the same may be readily moved about tight corners and into restricted spaces, or the like.

A supporting angle iron 22 is positioned transversely across the extremities of the rods 12 adjacent the end thereof, and back rests 23 are positioned at spaced intervals between the upright members 16. If desired, the back rests 23 may be supported on a backing of resilient material 24, which may comprise sponge rubber or other suitable material. An angle iron 25 extends across the base of the frame at a point adjacent the upright 16, and is similar to the angle iron 22.

In the operation of the device, an article to be handled, shown in dotted lines as at 25' in Figures 1 and 3, is positioned on the base between the angle irons 22 and 25, the length of the device being suitably adjusted to snugly accommodate the article to be moved, as by means of the telescoping sections 11 and 12 previously described. A webbing belt 26 suitably secured at one end in any desired member, as, for example, to one of the members 23, extends to a buckle 27 carried by a thong 28 secured about the transverse bar 14, the two portions 26 and 28 being adapted to be tightened securely to hold the article 25' in position. A second belt 29, which may also be comprised of webbing, leather, or the like, is secured as at 30 to one of the uprights 18, and adapted to be extended completely around the article 25. The opposite end of the belt 29 engages a spindle or pulley 31 including end plates 32 and mounted for rotation on a stub axle 33 carried within a bracket 34 including extending members 35 and 35' securely attached to the uppermost of members 23 as by bolts 36, or the like. The upper end of the axle 33 carries a ratchet 38, and terminates in a squared portion 39 which extends through a bushing 40 in the extending member 35' comprising a portion of the bracket 34. A pawl 41 (see Fig. 2) is positioned adjacent the ratchet 38, and pivotally secured, as on a pivot 42, to the bracket member 34. A suitable hand crank, or the like, may be positioned over the squared shaft 39 for rotating the same in order tightly to secure the belt 29 about the article 25.

From the foregoing, it will now be seen that there is herein provided an improved hand truck adapted for the carrying of articles of various sizes, to which the articles may be relatively tightly secured, and which may be readily moved into restricted spaces and around corners, or the like, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A hand truck including a longitudinally extensible, sectional base, casters supporting said base, a back integrally formed upon a first section of said base, said back including a pair of vertical, laterally spaced pillars, said pillars being inturned at their upper ends to constitute handles for said truck, a plurality of transversely disposed back rests secured to said pillars, a web article holding means having one end secured to one of said pillars and its other end wound upon a pulley supported by one of said back rests and a ratchet and pawl for retaining said pulley and said web in tensioned adjustment.

2. In a hand truck, a longitudinally extensible sectional base comprising a pair of U-shaped members, the legs of one of said U-shaped members telescopingly and adjustably engaged upon the legs of the other of said U-shaped members, casters supporting said members, a transverse angle iron secured to each U-shaped member at the bight thereof and an integral, upwardly extending back portion at the bight of one of said U-shaped members, a plurality of transverse back rests upon said back portions, cushioning means upon said back rests, and a web secured to said back portion and cooperating with said back rests and said angle iron to retain an article upon said truck.

3. In a hand truck, a longitudinally extensible sectional base comprising a pair of U-shaped members, the legs of one of said U-shaped members telescopingly and adjustably engaged upon the legs of the other of said U-shaped members, casters supporting said members, a transverse angle iron secured to each U-shaped member at the bight thereof and an integral, upwardly extending back portion at the bight of one of said U-shaped members, said back portion includes an integral vertical extension of each leg of said U-shaped member at its junction with the bight, each said vertical extension being looped downwardly at the top thereof and then folded inwardly and secured to the vertically extending portion thereof to form a handle, a transverse back rest secured between said vertical extensions, and a web tensioning pulley and ratchet mounted on the back of said back rest and between said handles.

FRANK HIGGINS.

REFERENCES CITED

The following references are of record in the file of this patent:

UNITED STATES PATENTS

| Number | Name | Date |
|---|---|---|
| 1,390,123 | Gilkey | Sept. 6, 1921 |
| 1,392,387 | Wood | Oct. 4, 1921 |
| 1,608,419 | Peacock | Nov. 23, 1926 |
| 2,165,603 | Yeats | July 11, 1939 |
| 2,219,609 | Askeris | Oct. 29, 1940 |
| 2,229,244 | Husted | Jan. 21, 1941 |